United States Patent [19]

Makino et al.

[11] 4,225,702

[45] Sep. 30, 1980

[54] METHOD OF PREPARING POLYAMIDE ACID TYPE INTERMEDIATES FOR PROCESSING OF SEMICONDUCTORS

[75] Inventors: Daisuke Makino, Hitachi; Yasuo Miyadera, Shimodate; Seiki Harada; Atsushi Saiki, both of Kokubunji, all of Japan

[73] Assignee: Hitachi Chemical Company, Ltd., Tokyo, Japan

[21] Appl. No.: 8,408

[22] Filed: Feb. 1, 1979

[30] Foreign Application Priority Data

Feb. 9, 1978 [JP] Japan .................................. 53-13773

[51] Int. Cl.$^2$ ............................................. C08G 73/10
[52] U.S. Cl. .................................... 528/353; 528/125; 528/126; 528/128; 528/172; 528/179; 528/182; 528/183; 528/184; 528/188; 528/223; 528/224; 528/226; 528/229; 528/351; 528/352; 528/480; 528/482

[58] Field of Search ............... 528/353, 183, 184, 179, 528/480, 482, 188, 172, 125, 126, 128, 223, 224, 226, 229, 182, 351, 352

[56] References Cited

U.S. PATENT DOCUMENTS

| | | | |
|---|---|---|---|
| 3,179,614 | 4/1965 | Edwards | 528/351 |
| 3,678,005 | 7/1972 | Rabilbud et al. | 528/353 |

*Primary Examiner*—Lester L. Lee
*Attorney, Agent, or Firm*—Frishauf, Holtz, Goodman & Woodward

[57] ABSTRACT

A method of preparing a polyamide acid type intermediate is provided, by using a purified inert solvent and monomer compounds, or diamine and/or diaminoamide compounds and a tetracarboxylic acid dianhydride, whose ionic impurities and free acid contents were reduced by recrystallization purification. The polyamide acid type intermediate may improve electrical properties and heat resistance of semiconductors when it is applied to, for instance, a surface-protecting film of semiconductors or an interlayer-insulating film of semiconductors having a multiple layer wiring structure.

2 Claims, No Drawings

METHOD OF PREPARING POLYAMIDE ACID TYPE INTERMEDIATES FOR PROCESSING OF SEMICONDUCTORS

BACKGROUND OF THE INVENTION

The invention relates to a method of preparing polyamide acid type intermediates for processing of semiconductors.

More particularly, it relates to a method of preparing polyamide acid type intermediates to be transformed into polyimide resins which, in turn, are used for processing of semiconductors, such as surface-protecting film of semiconductors or interlayer-insulating film of semiconductors having a multiple layer wiring structure.

Although silicon dioxide has been used for processing of semiconductors, such as surface-protecting film or interlayer-insulating film of semiconductors, in the latter case there being a multiple layers wiring structure, it has such defects to be overcome that cracks tend to develop when the thickness of its film is above 5 $\mu$m, or that it has a poor step coverage.

Organic materials, i.a. polyimide resins have been used in an attempt to overcome the above-mentioned defects, aiming at their excellent heat resistance, and as the results, problems such as development of cracks and step coverage have been dissolved.

However, their use has caused other problems. For instance heat resistance of polyimide resins decreases in the presence of a free acid produced by ring cleavage of tetracarboxylic acid dianhydride, thus lowering the reliability of semiconductors.

Further, electrical properties of semiconductors are impaired in the presence of ionic impurities, particularly metal ions contained in polyimide resins.

BRIEF SUMMARY OF THE INVENTION

It is, therefore, an object of the invention to provide polyamide acid type intermediates which may be transformed into polyimide resins which, in turn, may be used for processing of semiconductors, such as surface-protecting film of semiconductors, or interlayer-insulating film of semiconductors having a multiple layer wiring structure, whereby above-mentioned defects are overcome.

Other objects of the invention will become clear as the description proceeds.

It is proposed in Japanese Patent Publication No. 51-26934, as laid open to public inspection, to use ion-exchange resins to remove metal ions contained in polyamide acid type intermediates. Although the method may exert considerable effects, it fails to solve the problem that the heat resistance of polyimide resins decreases in the presence of a free acid, inasmuch as the method is to remove metal ions after polyamide acid type intermediates are prepared.

The inventors have found that the above-mentioned object, which could not be attained by the ion-exchange resin method, may be attained by using a purified inert solvent and monomer compounds purified by recrystallization in the preparation of polyamide acid type intermediates, and completed the invention.

The invention is, therefore, to provide a method of preparing a polyamide acid type intermediate for processing of semiconductors by using diamine and/or diaminoamide compounds and tetracarboxylic acid dianhydride as monomer compounds, the improvement of which method comprising using a purified inert solvent and aforesaid monomer compounds purified by recrystallization to decrease the contents of ionic impurities and free acid.

DETAILED DESCRIPTION OF THE INVENTION

The polyamide acid type intermediate of the invention is a copolymer having the formulae

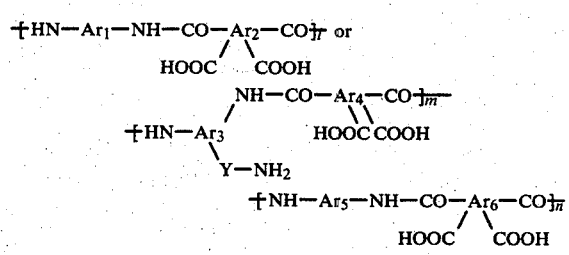

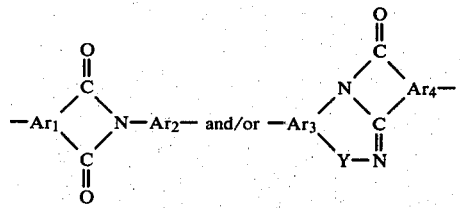

(wherein, $Ar_1$, $Ar_2$, $Ar_3$, $Ar_4$, $Ar_5$ and $Ar_6$ each represents an aromatic residue; Y represents $-SO_2-$ or $-CO-$; l, m and n each represents an integer.) and transformed into a polyimide resin containing groups (wherein, $Ar_1$, $Ar_2$, $Ar_3$, $Ar_4$ and Y are as defined above.) by dehydration and cyclization. As the diamine used as the monomer compound in this invention, there may be mentioned, for example, 4,4'-diaminodiphenyl ether, 4,4'-diaminodiphenylmethane, 4,4'-diaminodiphenyl sulfone, 4,4'-diaminodiphenyl sulfide, benzidine, m-phenylenediamine, p-phenylenediamine, 1,5-naphthalenediamine and 2,6-naphthalenediamine. They may be used alone or in combination.

As the diaminoamide compound, there may be mentioned, for example, 4,4'-diaminodiphenyl ether-3-sulfonamide, 3,4'-diaminodiphenyl ether-3-sulfonamide, 3,4'-diaminodiphenyl ether-3'-sulfonamide, 3,3'-diaminodiphenyl ether-4-sulfonamide, 4,4'-diaminodiphenylmethane-3-sulfonamide, 3,4'-diaminodiphenylmethane-4-sulfonamide, 3,4'-diaminodiphenylmethane-3'-sulfonamide, 3,3'-diaminodiphenylmethane-4-sulfonamide, 4,4'-diaminodiphenyl sulfone-3-sulfonamide, 3,4'-diaminodiphenyl sulfone-4-sulfonamide, 3,4'-diaminodiphenyl sulfone-3'-sulfonamide, 3,3'-diaminodiphenyl sulfone-4-sulfonamide, 4,4'-diaminodiphenyl sulfide-3-sulfonamide, 3,4'-diaminodiphenyl sulfide-4-sulfonamide, 3,3'-diaminodiphenyl sulfide-4-sulfonamide, 3,4'-diaminodiphenyl sulfide-3'-sulfonamide, 1,4-diaminobenzene-2-sulfonamide, 4,4'-diaminodiphenyl ether-3-carbonamide, 3,4'-diaminodiphenyl ether-4-carbonamide, 3,4'-diaminodiphenyl ether-3'-carbonamide, 3,3'-diaminodiphenyl ether-4-carbonamide, 4,4'-diaminodiphenylmethane-3-carbonamide, 3,4'-diaminodiphenylmethane-4-carbonamide, 3,4'-diaminodiphenylmethane-3'-carbonamide, 3,3'-diaminodiphenylmethane-4-carbonamide, 4,4'-diaminodiphenyl sulfone-3-carbonamide, 3,4′-diaminodiphenyl sulfone-4-carbonamide, 3,4′-diaminodiphenyl sulfone-3′-carbonamide, 3,3′-diaminodiphenyl sulfone-4-carbonamide, 4,4′-diaminodiphenyl sulfide-3-carbonamide, 3,4′-diaminodiphenyl sulfide-4-carbonamide, 3,3′-diaminodiphenyl sulfide-4-carbonamide, 3,4′-diaminodiphenyl sulfide-3′-sulfonamide and 1,4-diaminobenzene-2-carbonamide. They may be used alone or in combination.

As the tetracarboxylic acid dianhydride, there may be mentioned, for example, pyromellitic acid dianhydride, 3,3′,4,4′-diphenyltetracarboxylic acid dianhydride, 3,3′,4,4′-benzophenonetetracarboxylic acid dianhydride, cyclopentanetetracarboxylic acid dianhydride, 1,2,5,6-naphthalenetetracarboxylic acid dianhydride, 2,3,6,7-naphthalentetracarboxylic acid dianhydride, 2,3,5,6-pyridinetetracarboxylic acid dianhydride, 1,4,5,8-naphthalenetetracarboxylic acid dianhydride, 3,4,9,10-perylenetetracarboxylic acid dianhydride and 4,4′-sulfonyldiphthalic acid dianhydride. They may be used alone or in combination.

In preparation of polyamide acid type intermediate from the above-mentioned monomer compounds, there may be used inert solvents, preferably those which dissolve the polyamide acid type intermediate prepared, for example, N-methyl-2-pyrrolidone, N,N-dimethylacetamide, N,N-dimethylformamide, N,N-diethylformamide, dimethylsulfoxide, hexamethylphosphoramide and tetramethylenesulfone. They are used alone or in combination.

The synthesis of polyamide acid type intermediate is performed as follows.

Diamine and/or diaminoamide compounds and a tetracarboxylic acid dianhydride purified by recrystallization are dissolved in a purified inert solvent as thoroughly as possible. The mixture is stirred, maintaining it at about below 80° C., preferably at around or below ambient temperature, whereby the reaction proceeds rapidly, increasing the viscosity of the reaction system, thus yielding a polyamide type intermediate. In the preparation of polyamide acid type intermediate from the above-mentioned monomer compounds, it is preferable that an essentially equimolar amount of tetracarboxylic acid dianhydride less than ±0.5 mole % excess is used to diamine and/or diaminoamide compounds in order to obtain the best heat resistance. The purification of monomer compounds may be performed by recrystallization which is performed under per se known, non-limiting conditions.

Namely, each monomer compound is dissolved in a suitable solvent, under heating, filtered and cooled to precipitate the monomer compound.

The inert solvent to be used upon preparation of polyamide acid type intermediate also has to be purified, for instance, by distillation or ion-exchange. Usually, distillation may be advantageously performed rather than ion-exchange because it may improve the solvent purity and decrease the water content, besides removal of ionic impurities.

A brief explanation of example of application of the polyamide acid type intermediate, obtained by the method of the invention, to an interlayer-insulating film of integrated circuit (IC) having a double layer wiring structure is given as follows.

A solution of the polyamide acid type intermediate is spin-coated on the surface of a substrate having a first layer wiring. The solvent is evaporated and further heatcured if necessary, to form a polyimide resin which, in turn, is etched selectively with a photo resist to form through holes. On the substrate, aluminum as the second layer conductor metal is deposited, and a wiring layer is formed by photo etching.

Another application of the polyamide acid type intermediate, obtained by the method of the invention, to the surface-protecting film of a transistor for the prevention of the penetration of contaminants is given as follows.

A polyimide film is formed on a transistor substrate having an electrode, according to the similar method as described above. Then the polyimide film is removed only where bonding is applied, giving a transistor having a surface-coating film.

The invention is further explained by the following working examples and comparisons.

EXAMPLE 1

As the monomer compound in this Example, there were selected 4,4′-diaminodiphenyl ether, 4,4′-diaminodiphenyl ether-3-carbonamide, pyromellitic acid dianhydride and 3,3′,4,4′-benzophenonetetracarboxylic acid dianhydride, and they were purified by the following recrystallization:

(1) purification of 4,4′-dimainodiphenyl ether

In 5 liter flask equipped with a reflux condenser, 220 g of crude 4,4′-diaminodiphenyl ether and 2,840 g of n-butanol were placed. The 4,4′-diaminodiphenyl ether was dissolved under reflux, 60 g of active carbon was added and the mixture was filtered. The filtrate was allowed to stand at room temperature for 1 to 2 days and the precipitates were collected by filtration. The precipitates were dried under reduced pressure at 40° to 50° C. to yield the purified 4,4′-diaminodiphenyl ether.

(2) purification of 4,4′-diaminodiphenyl ether-3-carbonamide

The purification was conducted in the same manner as in (1), by using 300 g of 4,4′-diaminodiphenyl ether-3-carbonamide, 1,430 g of ethanol and 1,800 g of ion-exchanged water as a solvent for recrystallization to give the purified 4,4′-diaminodiphenyl ether-3-carbonamide.

(3) purification of pyromellitic acid dianhydride and 3,3′,4,4′-benzophenonetetracarboxylic acid dianhydride In 5 liter flask equipped with a reflux condenser, 600 g of crude pyromellitic acid dianhydride and 3,560 g of acetic anhydride were placed. The pyromellitic acid dianhydride was dissolved, under reflux, 90 g of active carbon was added and the mixture was filtered. The filtrate was allowed to stand at room temperature for 1 to 2 days and the precipitates were collected by filtration and dried at 150° C. for 2 days, giving the purified pyromellitic acid dianhydride.

The purification of 3,3′,4,4′-benzophenonetetracarboxylic acid dianhydride was conducted in all the same conditions to yield the purified 3,3′,4,4′-benzophenonetetracarboxylic acid dianhydride.

Concentrations of metal ions and free acids of the crude and purified compounds are shown in Table 1. It is apparent from Table 1 that the concentrations of metal ions and free acids decrease extremely by recrystallization.

TABLE 1

| Monomer compd. | Purification | Concentration of metal ion (ppm) | | | | Free acid |
|---|---|---|---|---|---|---|
| | | Na | K | Cu | Fe | |
| 4,4′-diamino-diphenyl | none | 792 | 12.5 | 9.3 | | 5.4 |

TABLE 1-continued

| Monomer compd. | Purification | Concentration of metal ion (ppm) | | | | Free acid |
|---|---|---|---|---|---|---|
| | | Na | K | Cu | Fe | |
| ether | purified | 1.1 | 0.3 | 1.9 | 0.9 | |
| 4,4'-diamino-diphenyl ether-3-carbonamide | none | 185 | 8.8 | 7.1 | 85.8 | |
| | purified | 1.0 | 0.8 | 2.0 | 1.9 | |
| | | | | | | mol.% |
| pyromellitic acid dianhydride | none | 2.0 | 0.7 | 1.4 | 1.6 | 24.57 |
| | purified | 0.6 | <0.1 | <0.1 | 0.3 | 0.04 |
| 3,3',4,4'-benzophenone-tetracarboxylic acid dianhydride | none | 1.9 | 1.5 | <0.1 | 4.5 | 0.86 |
| | purified | 1.1 | 0.6 | 0.7 | 2.0 | 0.00 |

As the solvent in this Example, there were selected N-methyl-2-pyrrolidone and N,N-dimethylacetamide, and they were distilled at 100° C./20 mmHg and 75° C./45 mmHg, respectively.

Concentration of metal ions of the distilled solvents is shown in Table 2.

TABLE 2

| Solvent | Concentration of metal ion (ppm) | | | |
|---|---|---|---|---|
| | Na | K | Cu | Fe |
| N-Methyl-2-pyrrolidone | <0.07 | <0.6 | <0.5 | <0.1 |
| N,N-dimethyl-acetamide | <0.07 | <0.6 | <0.5 | <0.1 |

In 300 ml three-necked flask equipped with a thermometer, stirrer and calcium chloride tube, 7.2 g (0.03 mol.) of above-purified 4,4'-diaminodiphenyl ether-3-carbonamide, 6.0 g (0.03 mol.) of above-purified 4,4'-diaminodiphenyl ether, 88 g of above-purified N-methyl-2-pyrrolidone and 88 g of above-purified N,N-dimethylacetamide were placed and stirred thoroughly. Into the mixture, 7.26 g (0.03 mol.) of above-purified pyromellitic acid dianhydride and 10.74 g (0.03 mol.) of above-purified 3,3',4,4'-benzophenonetetracarboxylic acid dianhydride were added, little by little. After completion of addition, the whole mixture was stirred for 5 hours to proceed the reaction, giving a solution of polyamide acid type intermediate containing 15% by weight of resin, which will be called "varnish A" in hereinafter description.

COMPARISON 1

A solution of polyamide acid type intermediate containing 15% by weight of resin, which will be called "varnish B" in hereinafter description, was prepared by using unpurified monomer compounds and purified solvents, in accordance with the same composition and procedures as in Example 1.

The concentration of metal ions in varnishes obtained by Example 1 and Comparison 1 is shown in Table 3, which apparently indicates that the metal ions concentration in varnish decreases drastically when the monomer compounds purified by recrystallization are used, as compared when the umpurified monomer compounds are used.

TABLE 3

| Vanish | Concentration of metal ion (ppm) | | | |
|---|---|---|---|---|
| | Na | K | Cu | Fe |
| varnish A | 0.51 | <0.40 | <0.32 | 0.10 |
| varnish B | 54.00 | 1.06 | 3.20 | 0.59 |

EXAMPLE 2

Varnish A obtained in Example 1 was coated on a transistor fitted with an aluminum electrode, and the transistor was heat-processed at 100° C. for 1 hour and at 220° C. for further 1 hour. The part just above the aluminum electrode was etched with hydrazine and then heat-processed at 350° C. for 1 hour. Thereon, aluminum was deposited, giving a double layer structure. The current amplifying ratio [change in $h_{FE}$ linearity = $h_{FE}$ linearity when processed at 520° C.—$h_{FE}$ linearity before heat-processing] of the transistor thus obtained was +0.3%.

COMPARISON 2

A transistor having a double layer structure was prepared in the similar manner as in Example 2, by using varnish B obtained in Comparison 1. The current amplifying ratio of the transistor was −45%.

It is apparent from the results of Example 2 and Comparison 2 that the electrical properties of transistor may be improved remarkably, by using a varnish prepared with monomer compounds purified previously by recrystallization.

EXAMPLE 3

Varnish A obtained in Example 1 was poured and coated onto a glass plate and heat-processed at 100° C. for 2 hours, giving film of thickness 40–50 μm. The film was further heat-processed as 220° C. for 1 hour, then at 350° C. for 1 hour.

The temperature at which weight loss began, as well as weight loss rate at 450° C. were determined with a differential thermobalance, indicating 466° C. and 4.9%, respectively.

COMPARISON 3

A film was prepared in the similar manner as in Example 3, by using varnish B obtained in Comparison 1. The temperature at which weight loss began, and the weight loss rate at 450° C. were 443° C. and 51%, respectively.

It is apparent from the results of Example 3 and Comparison 3 that a varnish with an excellent heat resistance may be obtained, by using monomer compounds purified previously to remove free acids by recrystallization.

From the foregoing descriptions, it is understood that electrical properties and heat resistance of semiconductors may be improved by using a polyamide type intermediate, which is prepared with monomer compounds whose ionic impurities and free acid contents have been reduced by recrystallization purification, when it is applied to a surface-protecting film of semiconductors or an interlayer-insulating film of semiconductors having a multiple layer wiring structure.

What is claimed is:

1. A method of preparing a polyamide acid type intermediate for processing of semiconductors by reacting at least one compound selected from the group consisting of diamine and diaminoamide compounds, and a tetracarboxylic acid dianhydride, as monomer compounds, the improvement comprises using (A) an inert solvent purified by distillation or ion-exchange, and (B) said monomer compounds having been purified to have reduced contents of ionic impurities and free acid by recrystallization comprising dissolving each monomer being purified in a solvent which is heated, then filtering and cooling the filtrate to precipitate purified monomer.

2. The method as claimed in claim 1, wherein the tetracarboxylic acid dianhydride is used in essentially equimolar amount less than ±0.5 mole % excess to the diamine and/or diaminodiamide compounds.

* * * * *